United States Patent [19]

Cantoni

[11] Patent Number: 4,740,154
[45] Date of Patent: Apr. 26, 1988

[54] FREE FLAME BURNER WITH TURBULENT ATOMISATION BY MEANS OF GASEOUS COMBUSTION PRODUCTS

[75] Inventor: Angelo Cantoni, Rome, Italy

[73] Assignee: Ital Idee s.r.l., Rome, Italy

[21] Appl. No.: 836,805

[22] Filed: Mar. 6, 1986

[30] Foreign Application Priority Data

Mar. 6, 1985 [IT] Italy ................................ 47775 A/85

[51] Int. Cl.⁴ .......................... F23N 1/00; F23L 15/00
[52] U.S. Cl. ......................................... 431/36; 431/11;
431/115; 431/208; 431/354; 239/404
[58] Field of Search ................ 431/5, 9, 11, 36, 79,
431/89, 115, 208, 215, 265, 354, 6, 31; 239/399,
403, 404, 405, 409

[56] References Cited

U.S. PATENT DOCUMENTS

| | | | |
|---|---|---|---|
| 1,896,910 | 2/1933 | Merkt | 431/115 |
| 2,217,518 | 10/1940 | Merkt | 431/115 |
| 2,224,544 | 12/1940 | Keller | 431/115 |
| 2,688,360 | 9/1954 | Haynes et al. | 431/115 |
| 3,116,017 | 12/1963 | Straw et al. | 239/404 |
| 3,146,821 | 9/1964 | Wvetig | 431/115 |
| 3,880,570 | 4/1975 | Marshall | 431/115 X |
| 3,885,904 | 5/1975 | Feng | 431/215 X |
| 3,980,422 | 9/1976 | Dennis | 431/116 |
| 4,488,869 | 12/1984 | Voorheis | 431/352 |
| 4,588,375 | 5/1986 | Sandstrom | 431/354 X |

FOREIGN PATENT DOCUMENTS

| | | | |
|---|---|---|---|
| 1119245 | 6/1956 | France | 431/115 |
| 2372385 | 7/1978 | France | 431/215 |

OTHER PUBLICATIONS

Patent Abstracts of Japan, vol. 4, No. 139 (M-34) (621), Sep. 30, 1980.
Patent Abstracts of Japan, vol. 7, No. 217 (M-245) (1362), Sep. 27, 1983.

*Primary Examiner*—Margaret A. Focarino
*Attorney, Agent, or Firm*—Fleit, Jacobson, Cohn & Price

[57] ABSTRACT

This invention relates to a free flame burner with turbulent atomisation, which comprises a fuel oil feed pump, a combustion air feed fan and a compressor for feeding a fraction of the gaseous combustion products to a combustion chamber, wherein the fuel oil and said fraction of gaseous combustion products are fed, with mutually opposing rotary motion, to an atomiser nozzle in which the gas and fuel unite turbulently before being fed into the combustion chamber.

15 Claims, 2 Drawing Sheets

FREE FLAME BURNER WITH TURBULENT ATOMISATION BY MEANS OF GASEOUS COMBUSTION PRODUCTS

BACKGROUND OF THE INVENTION

Free flame burners for fuel oils such as gas oil, light fuel oil and the like are distinguishable from each other by their fuel atomisation system.

The fuel atomisation is known to strongly influence the efficiency of the entire system. In this respect, better atomisation leads to better fuel utilisation, lesser soiling of the heat exchangers and lesser pollutant emission into the stack.

For this purpose, the most usual method is to provide mechanical atomisation by feeding the fuel to the atomiser nozzle under high pressure of up to some tens of an atmosphere.

Other systems employing steam, compressed air or water emulsified with the fuel are used, and these are of higher efficiency than mechanical atomisation.

However, such systems have drawbacks when in use, as they require the production of steam, the presence of an air compressor or complicated metering and water emulsifying equipment. Moreover, these systems imply additional water evaporation costs which in some cases strongly penalise the plant energy yield, and they often require frequent and costly maintenance.

For many types of fuel oil of high viscosity, density and evaporation temperature, it is also necessary to use a preheater before feeding the oil to the nozzle, with additional plant costs.

The object of the present invention is therefore to provide a burner which obviates the aforesaid problems by providing high-efficiency atomisation even with oils having characteristics at the limits of the official specifications, the fuel being heated to the necessary level for optimum atomisation without additional energy and plant costs.

SUMMARY OF THE INVENTION

These and further problems are solved according to the present invention by a free flame burner with turbulent atomisation, which comprises a fuel oil feed pump, a combustion air feed fan and a compressor for feeding a fraction of the gaseous combustion products to a combustion chamber, wherein the fuel oil and said fraction of gaseous combustion products are fed to an atomizer nozzle in which the gas and fuel unite turbulently before being fed into said combustion chamber.

Conveniently, the fraction of gaseous combustion products passes through a heat exchanger for cooling before reaching the suction side of the compressor. The heat exchanger cooling fluid is the actual combustion air fed by the fan to the combustion chamber, and a member for controlling the flow through the heat exchanger is provided, operated automatically by a member which senses the temperature of the gaseous combustion products, to limit the maximum feed temperature of these latter to the compressor.

The feed pipe for the gaseous combustion products comprises a settling chamber for decanting the solid particles present in the gas before reaching the compressor.

A heater element is also present in the feed pipe for the gaseous combustion products in order to preheat the intake air when the burner is started in the absence of high-temperature gaseous combustion products, an automatic member being provided for cutting-out the heater when the burner is generating gaseous combustion products.

Conveniently, the heater element is located in the settling chamber and consists of an electrical resistance element controlled by a thermostat measuring the temperature of the gaseous combustion products.

The nozzle is in the form of an element connected to the feed pipe for the gaseous combustion products and is provided with several oblique holes which feed the fuel with rotary motion to a mixing chamber into which there open several helical ducts feeding the gaseous combustion products from an annular header connected to the gaseous combustion product feed pipe, the helical ducts causing the gas to rotate in the opposite direction to that imparted to the fuel by the oblique holes, the mixing chamber also being provided with a sized orifice for feeding the gas and fuel mixture into the combustion chamber.

DESCRIPTION OF THE DRAWINGS

The invention will be more apparent from the description given hereinafter with reference to the accompanying drawings, in which.

DETAILED DESCRIPTION

Figure 1:
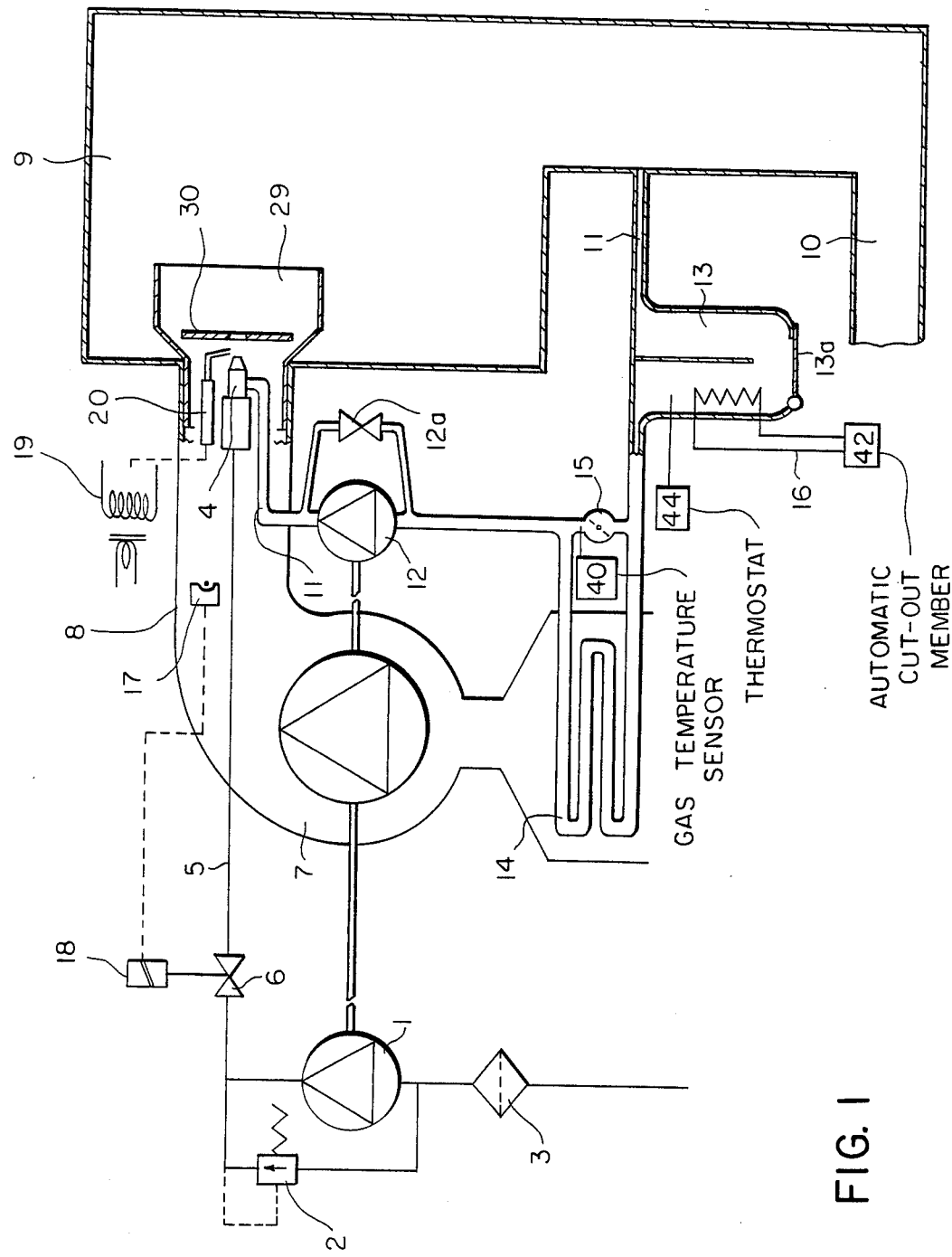
FIG. 1 is a general schematic diagram of the system according to the invention.

FIG. 1 shows a burner for a thermal installation, and comprising a fuel oil pump 1 which is provided with a pressure controller 2 and is preceded by a filter 3, and feeds an atomiser and mixer nozzle 4 by way of the fuel pipe 5 which is provided with an automatic shut-off valve 6.

The combustion air is fed to the mouth of the combustion chamber 9 by a fan 7 and the relative duct 8.

After undergoing heat exchange in the combustion chamber 9, for example with a tube bundle or the like not described in detail, the flue gas is conveyed to a stack 10. A part of this gas, at high temperature is withdrawn through a pipe 11 and fed to the nozzle 4 by means of a compressor 12.

Along the pipe 11 there are provided a settling chamber 13 for depositing unburnt solid particles present in the flue gas, and a heat exchanger 14 which cools the flue gas before it reaches the compressor 12 should its temperature be too high for the compressor.

The throughput of the gaseous combustion products fed by the compressor 12 can be adjusted by a bypass valve 12a to attain the optimum ratio of fuel to fed gaseous combustion products for best atomisation. The valve 12a can be controlled automatically to adapt to different burner operating loads.

Passage through the heat exchanger 14 is controlled by an automatically operated damper 15 controlled by a gas temperature sensor 40. The cooling fluid of the heat exchanger 14 is the actual intake air of the fan 7, so that the heat removed from the flue gas is recovered in the form of heat content in the combustion air, and is therefore added to the heat produced by the combustion.

In the settling chamber 13 there is also a heater element 16, such as an electrical resistance element, the purpose of which is to heat the cold air drawn in during the start-up of the system, i.e. when no high-temperature gaseous combustion products are present as measured by thermostat 44, so as to ensure that the temperature of the initial air and fuel mixture is ideal for atomisation. In the base of the settling chamber 13 there is an openable door 13a, which allows the chamber 13 to be emptied and periodically cleaned.

The heater 16 is provided with an automatic cut-out member 42 which operates when the gaseous combustion products begin to arrive, these latter already being at a temperature higher than the temperature generated by the heater.

The burner also comprises an electrical sensor constituted by a photoelectric cell or photoresistor 17, which acts on the actuator 18 of the automatic valve 6 to cause the valve to close and shut-off the fuel flow should the burner flame become extinguished, thus shutting down the entire system. A high voltage transformer 19 is also provided for feeding a pair of electrodes 20 to ignite the air and fuel mixture on start-up. A mouthpiece 29 and flame disc 30 uniformly distribute the flame, so that its front is kept compact and at a constant distance.

Conveniently, the fuel feed pump 1, the fan 7 and compressor 12 can be operated by a single electric motor, if their location and their respective rotational speeds allow this.

Figure 2:
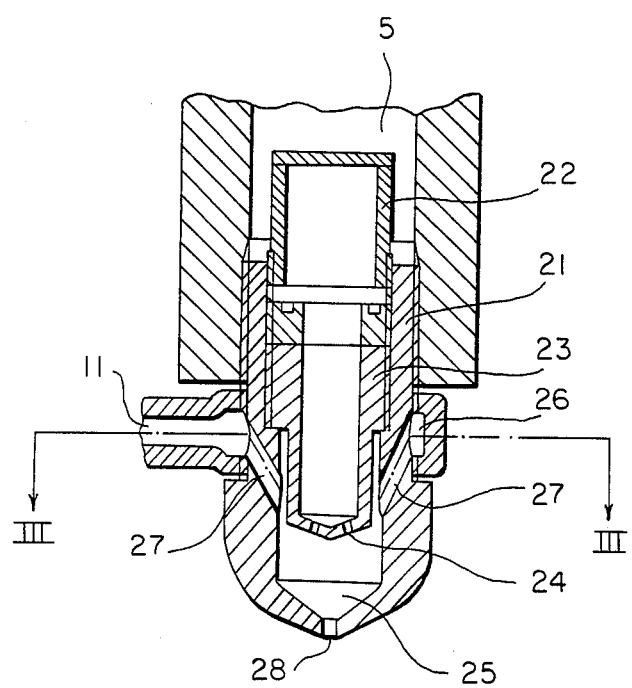
FIG. 2 is a cross-section through a nozzle for the system of FIG. 1.
Figure 3:
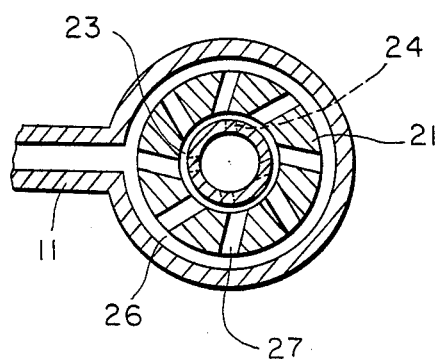
FIG. 3 is a section on the plane III—III of FIG. 2.

FIGS. 2 and 3 show a suitable embodiment of the atomiser nozzle 4, which consists of a body 21 disposed at the outlet of the fuel feed pipe 5 and carrying a filter element 22. In its interior there is mounted an injector 23 provided with oblique holes 24 tangentially orientated to give the fuel an anticlockwise rotation as it enters the underlying mixing chamber 25.

Inside the body 21 there is an annular header 26 connected to the flue gas feed pipe 11, and from which the pressurised gaseous combustion products are fed to the mixing chamber 25 through several helical bores 27 disposed in such a manner as to make the gas rotate in a clockwise direction as it enters the chamber 25.

The mixture formed in the chamber 25 then emerges through a sized orifice 28 into the combustion chamber 9.

This mixing of the fuel with the high-temperature gaseous combustion products together with the considerable turbulence generated in the mixing chamber 25 leads to optimum fuel atomisation. This means, inter alia, that a lower fuel pressure at the nozzle can be used, with considerable saving in electrical energy, sufficient to completely offset the energy consumption of the compressor. In addition, the low feed pressure at the nozzle means that the cross-sectional areas of the pipes through which the fuel passes can be greater than in the case of burners of the known art, they thus being less critical particularly for low-capacity burners.

The burner according to the invention is therefore particularly convenient as it enables the fuel oil to be preheated without any additional heating cost, namely by utilising the heat content of the gaseous combustion products.

Finally according to the invention, two nozzles can be used, and which can also be controlled separately.

Various modifications can be made to the burner according to the invention, but without leaving the scope of protection thereof.

What is claimed is:

1. A free flame burner with turbulent atomization, said free flame burner comprising
   a fuel oil feed pump,
   a combustion air feed fan,
   a combustion chamber,
   a compressor for feeding a fraction of gaseous combustion products produced in said combustion chamber back to said combustion chamber, and
   an atomizer nozzle for turbulently mixing fuel oil from said fuel oil feed pump and said fraction of gaseous combustion products before being fed into said combustion chamber, with the fuel oil thereby being finely atomized,
   said atomizer nozzle including an element provided with several oblique holes which feed the fuel oil with rotary motion to a mixing chamber into which there are several helical ducts feeding said fraction of the gaseous combustion products from an annular header, said helical ducts causing said fraction of gaseous combustion products to undergo rotation in the opposite direction to that imposed on the fuel oil by the oblique holes, said mixing chamber also being provided with a sized orifice for feeding said fraction of gaseous combustion products and fuel oil mixture into said combustion chamber.

2. A burner according to claim 1, wherein said fraction of gaseous combustion products passes through a heat exchanger before reaching a suction side of said compressor, said heat exchanger using the combustion air fed by said combustion air feed fan to said combustion chamber as a cooling fluid.

3. A burner according to claim 2, wherein a member for controlling the flow of said fraction of gaseous combustion products through said heat exchanger is operated automatically by a sensor which senses the temperature of said fraction of gaseous combustion products to limit a feed temperature of said fraction of gaseous combustion products to said compressor.

4. A burner according to claim 3, wherein a feed pipe for said fraction of gaseous combustion products includes a settling chamber for decanting solid particles present in said fraction of gaseous combustion products before reaching said compressor.

5. A burner according to claim 4, wherein a heater element is provided in said feed pipe for said fraction of gaseous combustion products to preheat the intake air when the burner is started in the absence of high-temperature gaseous combustion products, and an automatic member for cutting out the heater when said fraction of the gaseous combustion products is present.

6. A burner according to claim 5, wherein said heater element is an electrical resistance element and is controlled by a thermostat which measures the temperature of said fraction of gaseous combustion products.

7. A burner according to claim 6, wherein said heater element is located in said settling chamber.

8. A free flame burner with turbulent atomization, said free flame burner comprising:
   a fuel oil feed pump,
   a combustion air feed fan,
   a combustion chamber,
   a compressor for feeding a fraction of gaseous combustion products produced in said combustion chamber back to said combustion chamber,
   an atomizer nozzle for turbulently mixing fuel oil from said fuel oil pump and said fraction of gaseous combustion products before being fed into said combustion chamber, with the fuel oil thereby being finely atomized,
   a heater element provided in a feed pipe to said atomizer nozzle for said fraction of gaseous combustion products to preheat intake air when the burner is started in absence of high-temperature gaseous combustion products, and an automatic member for cutting out the heater element when said fraction of gaseous combustion products is present at a predetermined temperature, said atomizer nozzle including an element provided with several oblique holes which feed the fuel oil with rotary motion to a mixing chamber into which there are several helical ducts feeding said fraction of gaseous combustion products from an annular header, said helical ducts causing said fraction of gaseous combustion products to undergo rotation in the opposite direction to that imposed on the fuel oil by the oblique holes, said mixing chamber also being provided with a sized orifice for feeding said fraction of gaseous combustion products and fuel oil mixture into said combustion chamber.

9. A burner according to claim 8, wherein said fraction of gaseous combustion products passes through a heat exchanger before reaching a suction side of said compressor, said heat exchanger using the combustion air fed by said combustion feed fan to said combustion chamber as a cooling fluid.

10. A burner according to claim 9, wherein a member for controlling the flow of said friction of gaseous combustion products through said heat exchanger is operated automatically by sensor which senses the temperature of said fraction of gaseous combustion products to limit a feed temperature of said fraction of gaseous combustion products to said compressor.

11. A burner according to claim 10, wherein a feed pipe for said fraction of gaseous combustion products includes a settling chamber for decanting solid particles present in said fraction of gaseous combustion product before reaching the compressor.

12. A burner according to claim 8, wherein said heater element is an electrical resistance element and is controlled by a thermostat which measures the temperature of said fraction of gaseous combustion products.

13. A burner according to claim 11, wherein said heater element is located in said settling chamber.

14. A free flame burner of the kind with turbulent atomization, said free flame burner comprising:
   a fuel oil feed pump,
   a combustion air feed fan,
   a combustion chamber,
   a compressor for feeding a fraction of gaseous combustion products produced in said combustion chamber back to said combustion chamber,
   mixing means for feeding fuel oil from said fuel oil feed pump in a direction of rotation as said fuel oil enters a mixing chamber and for feeding said fraction of combustion gases from said compressor in a direction of rotation opposite to said direction of rotation of said fuel oil as said fraction of combustion gases enters said mixing chamber so that said fraction of gaseous combustion products and said fuel oil unite turbulently before being fed into said combustion chamber.

15. A free flame burner according to claim 14, wherein said mixing means includes an atomizer nozzle including a body disposed at the outlet of a fuel feed pipe and carrying a filter element in the interior of said body and an injector provided with oblique holes tangentially orientated to give to the fuel oil said rotation as it enters a mixing chamber inside said body and an annular header connected to a flue gas feed pipe, and from which said fraction of gaseous combustion products is fed to said mixing chamber through several helical bores disposed so as to make said gaseous combustion products rotate in a direction opposite to the direction of rotation of said fuel oil as said fuel oil and said fraction of gaseous combustion products enter said combustion chamber.

* * * * *